United States Patent [19]

Maurer et al.

[11] Patent Number: 5,106,947

[45] Date of Patent: Apr. 21, 1992

[54] CURABLE COMPOSITION BASED ON CYCLOALIPHATIC EPOXY RESINS

[75] Inventors: Jürg Maurer, Riehen; Robert P. Peyer, Bern, both of Switzerland

[73] Assignee: Ciba-Geigy Corporation, Ardsley, N.Y.

[21] Appl. No.: 506,405

[22] Filed: Apr. 6, 1990

[30] Foreign Application Priority Data

Apr. 17, 1989 [CH] Switzerland .................. 1441/89

[51] Int. Cl.$^5$ ............................................. C08G 59/24
[52] U.S. Cl. ..................................... 528/361; 528/365
[58] Field of Search ............. 528/103, 354, 361, 365

[56] References Cited

U.S. PATENT DOCUMENTS

| | | | |
|---|---|---|---|
| 2,750,395 | 6/1956 | Phillips et al. | 549/547 |
| 2,863,881 | 12/1958 | Phillips et al. | 549/547 |
| 3,425,961 | 2/1969 | Jellinek | 528/405 |
| 4,549,008 | 10/1985 | Renner et al. | 528/220 |
| 4,581,441 | 4/1986 | Kleiner et al. | 528/361 |
| 5,011,904 | 4/1991 | Cavitt et al. | 528/103 |

Primary Examiner—Morton Foelak
Assistant Examiner—Shelley A. Wright
Attorney, Agent, or Firm—JoAnn Villamizar

[57] ABSTRACT

Curing a curable composition comprising
(a) 90 to 50% by weight of a diglycidyl ether of hydrogenated bisphenol A, a diglycidyl ether of hydrogenated bisphenol F, or a mixture thereof,
(b) 50 to 10% by weight of a cycloaliphatic epoxy resin consisting of formula I, II, III

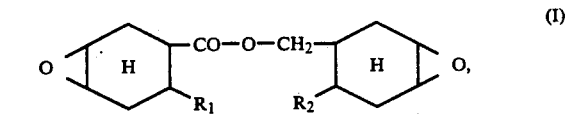

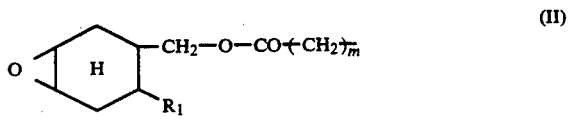

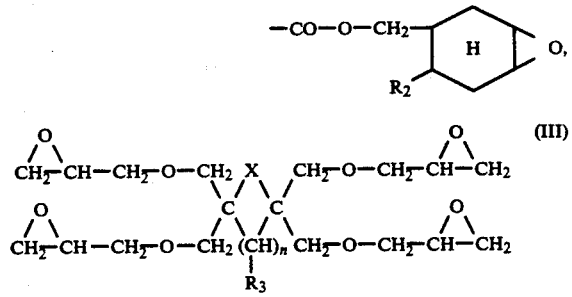

or a mixture thereof, wherein $R_1$ and $R_2$ are each independently of the other a hydrogen atom or methyl, m is an interger from 2 to 6, X is a group

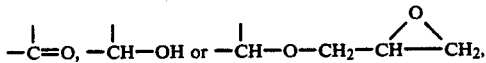

$R_3$ is hydrogen or methyl and n is an integer from 2 to 4, and the radical $R_3$ may have different meanings within the molecule and the mixture of components (a) and (b) is 100% by weight,
(c) a cycloaliphatic polycarboxylic anhydride as hardener, and, as additional optional component,
(d) a curing catalyst, gives moulding or coatings having valuable thermomechanical properties and enhanced resistance to hydrolysis and weathering.

10 Claims, No Drawings

CURABLE COMPOSITION BASED ON CYCLOALIPHATIC EPOXY RESINS

The present invention relates to a curable composition comprising a diglycidyl ether of hydrogenated bisphenol A or a diglycidyl ether of hydrogenated bisphenol F, specific cycloaliphatic epoxy resins and cycloaliphatic polycarboxylic anhydrides, to the use of said curable composition for use in surface protection and, in particular, as casting and impregnating resin, as well as to the mouldings or coatings obtained therefrom by curing.

Diglycidyl ethers of hydrogenated bisphenol A and hydrogenated bisphenol F are known, for example, from Swiss patent 476787, and are used together with curing agents for making arc-resistant and creep-resistant moulded articles or coatings made from synthetic resin compositions. The moulded articles made from such curable compositions have poor resistance to thermomechanical stress, for they have too low a deflection temperature under load for many technical utilities.

Cycloaliphatic epoxy resins of formulae I and II below, for example 3,4-epoxycyclohexyl-methyl-3,4-epoxycyclohexanecarboxylate, for example under the registered trademark ERL 4221 or Unox® 289. Polyglycidyl ethers of formula III below, for example the tetraglycidyl ether of 2,2,6,6-tetramethylol-cyclohexanol or 2,2,6,6-tetramethylolcyclohexanone are known from European patent application 0 135 477. However, the mouldings made from such cycloaliphatic epoxy resins are brittle. In spite of the very high crosslinking density of anhydride-cured epoxy resins, the mouldings so formulated containing mineral fillers absorb a relatively large amount of water in a boiling water test.

In German Offenlegungsschrift 3 242 711, the proposal is made to enhance the unfavourable properties of 3,4-epoxycyclohexylmethyl-3,4-epoxycyclohexanecarboxylate by using this epoxy resin in admixture with diglycidyl hexahydrophthalate. Upon curing such an epoxy resin mixture with customary polycarboxylic anhydrides, the mouldings obtained have enhanced mechanical properties, but they absorb a fairly large amount of water.

It has now been found that mouldings or coatings having valuable thermomechanical properties, a surprisingly low water absorption and excellent resistance to weathering are obtained by curing a mixture of a diglycidyl ether of hydrogenated bisphenol A or a diglycidyl ether of hydrogenated bisphenol F and specific cycloaliphatic epoxy resins, with cycloaliphatic polycarboxylic anhydrides.

Accordingly, the present invention relates to a curable composition comprising (a) 90 to 50% by weight of a diglycidyl ether of hydrogenated bisphenol A, a diglycidyl ether of hydrogenated bisphenol F, or a mixture thereof, (b) 50 to 10% by weight of a cycloaliphatic epoxy resin consisting of formula I, II, III

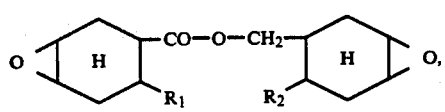

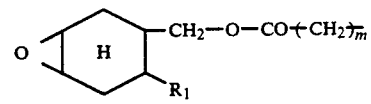

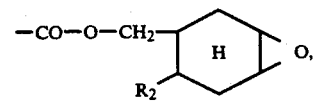

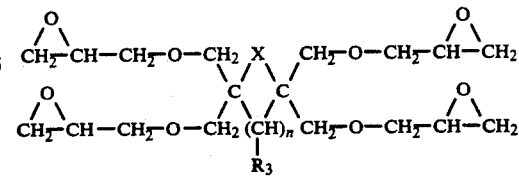

or a mixture thereof, in which formulae $R_1$ and $R_2$ are each independently of the other a hydrogen atom or methyl, m is an integer from 2 to 6, X is a group

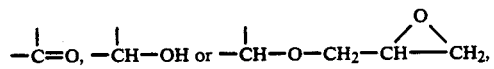

$R_3$ is hydrogen or methyl and n is an integer from 2 to 4, which radical $R_3$ may have different meanings within the molecule and said mixture of components (a) and (b) being 100% by weight, (c) a cycloaliphatic polycarboxylic anhydride as hardener, and, as additional optional component, (d) a curing catalyst.

The composition of this invention preferably contains a diglycidyl ether of hydrogenated bisphenol A or a diglycidyl ether of hydrogenated bisphenol F as component (a).

Component (b) of the composition of this invention is preferably a cycloaliphatic epoxy resin of formula I, II or III, most preferably a cycloaliphatic epoxy resin of formula I or III.

As stated at the outset, cycloaliphatic epoxy resins of formula I are commercially available, as are also some of those of formula II, the preparation of which is described in more detail in U.S. Pat. Nos. 2,750,395 and 2,863,881.

Among the cycloaliphatic epoxy resins of formula III, it is preferred to use those for the composition of this invention wherein X is the group

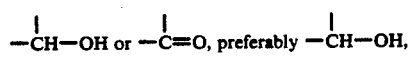

R is a hydrogen atom and n is 2 or 3, preferably 3. The cycloaliphatic epoxy resins of formula III can be prepared by the process disclosed in European patent application 0 135 477 by reacting a compound of formula IV

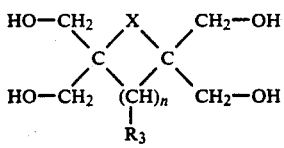

(IV)

wherein X, R₃ and n are as previously defined, with an epihalohydrin, in the presence of a catalyst, to the corresponding tetrahalohydrin ether, and dehydrohalogenating said ether in the presence of an alkali metal hydroxide.

Illustrative examples of suitable compounds of formula IV and 2,2,6,6-tetramethylolcyclo-hexanol, 4-methyl-2,2,6,6-tetramethylolcyclohexanol, 2,2,6,6-tetramethylolcyclohexanone and 2,2,5,5-tetramethylolcyclopentanone.

The composition of this invention preferably comprises 85 to 60% by weight, most preferably 80 to 70% by weight, of component (a), and preferably 40 to 15% by weight, most preferably 30 to 20% by weight, of component (b).

Component (c) of the composition of the invention may typically be a cycloaliphatic poly-carboxylic anhydride selected from the group consisting of tetrahydrophthalic anhydride, hexahydrophthalic anhydride, methyltetrahydrophthalic anhydride, hexachloroendom-ethylenetetrahydrophthalic anhydride, endomethylenetetrahydrophthalic anhydride and methylendomethylenetetrahydrophthalic anhydride.

Component (c) of the composition of the invention is preferably a cycloaliphatic dicarboxylic anhydride, most preferably hexahydrophthalic anhydride or methylhexahydrophthalic anhydride.

In the curable composition of this invention, components (a) and (b) are present in the customary ratios to component (c), i.e. the mixture ratio may be chosen such that 0.5 to 1.2 equivalents of anhydride group are supplied per equivalent of epoxy group.

The curing accelerator (d) which may be present in the composition of this invention as optional additional component may be selected from per se known compounds. The compositions will preferably contain a curing accelerator. Typical examples of curing accelerators are: complexes of amines, preferably tertiary amines such as monoethylamine, trimethylamine and octyldimethylamine, with boron trifluoride or boron trichloride, tertiary amines such as benzyldimethylamine, tris(dimethylaminomethyl)phenol, hexamethylene-tetramine or 1,6(dimethylamino)hexane; urea derivatives such as N-4-chlorophenyl-N', N'-dimethylurea(monuron), N-3-chloro-4-methylphenyl-N',N'-dimethylurea (chlorotoluron), N-(2-hydroxyphenyl)-N',N'-dimethylurea and N-(2-hydroxy-4-nitrophenyl)-N',N'-dimethylurea, and unsubstituted or su 1-methylimidazole, 3-methylimidazole, 2-ethyl-4-methylimidazole, 2-vinyl-imidazole, 2-phenylimidazole, 2-phenyl-4-methylimidazole, 1-(2,6-dichlorobenzoyl)-2-phenylimidazole and 1-(2,4,6-trimethylbenzoyl)-2-phenylimidazole.

Tertiary amines, especially benzyldimethylamine, and imidazoles, especially 2-phenyl-imidazole, 1-methylimidazole, and 2-ethyl-4-methylimidazole, are preferred curing accelerators (d).

Curing accelerators are ordinarily used in amounts of 0.1 to ca. 5.0% by weight, preferably of 0.5 to 5% by weight, based on the epoxy resin components (a) and (b) and on the curing hardener(c).

Conventional modifiers, such as plasticisers, extenders, fillers and reinforcing agents, can be added to the composition of this invention in any phase before the cure. Typical examples of such conventional modifers are coal tar, bitumen, textile fibres, glass fibres, asbestos fibres, boron fibers, carbon fibres, mineral silicates such as wollastonite, mica, powdered quartz, alumina, alumina trihydrate, bentonites, kaolin, silica aerogel or metal powders such as aluminium powder or iron powder, and also pigments and dyes such as carbon black, oxide colourants, titanium dioxide, flame retardants, thixotropic agents, flow control agents such as silicones, waxes or stearates (some of which can also be used as mould release agents), adhesion promoters, antioxidants and light stabilisers.

Owing to the advantageous properties of the moulded articles and coatings made form them, the compositions of this invention find utility in surface protection, especially for making cured products in the electrical and electronic fields. They can be used in a formulation adapted to suit each particular utility, in an unfilled or filled state, as paint compounds, coating compositions, lacquers, compression moulding materials, dipping resins, casting resins, impregnating resins and laminating resins.

The compositions of this invention can be prepared in conventional manner using mixing units, for example agitators, kneaders, rolls or mills. The fillers or conventional modifiers may be added to a single component or to the curable composition.

The cure of the compositions of this invention can be effected in a manner known per se in a single step or in two steps. The cure is ordinarily effected by heating to temperatures in the range from 80° to 200° C., preferably from 100° to 180° C.

The mouldings, coatings or insulations made from the compositions of the invention are distinguished in particular by enhanced resistance to hydrolysis and weathering, as well as by excellent thermomechanical properties.

EXAMPLE 1

74 g of hexahydrophthalic anhydride and 1 g of benzyldimethylamine are homogenised at 60° C. and the mixture is added to a resin mixture consisting of 70 g of a diglycidyl ether of hydrogenated bisphenol A having an epoxy value of 4.51 eq/kg and 30 g of 3,4-epoxycyclohexylmethyl-3',4'-epoxycyclohexanecarboxylate having an epoxy value of 7.16 eq/kg. The mixture is heated to 70° C. and then 263 g of silanated quartz powder (W 12 EST ®, ex Quarzwerke Frechen) are stirred in over 5 minutes while simultaneously raising the temperature to 80° C. After it has been degassed by stirring for 5 to 10 minutes under reduced pressure (1–2 bar), the casting resin composition is then poured into moulds. The composition is cured for 2 hours at 100° C. and for 16 hours at 160° C.

The mouldings are tested for the following properties:

| | |
|---|---|
| absorption of boiling water after 100 hours | (%) 0.6 |
| 1% uptake of boiling water after (DIN 53 495) | (h) > 935 |
| diffusion dielectric strength (VDE 0441) | (step) HD2 |
| glass transition temperature (Tg) measured by DSC* | (°C.) 126 |

-continued

| flexural strength (ISO 178) | (N/mm²) 130 |
| deflection temperature under load (ISO 75) | (°C.) 127 |
| impact strength (ISO 179) | (kJ/m²) 10 |
| creep resistance (IEC 112/VDE 0303) | (CTI) > 600M −0.0 |
| arc resistance (ASTM 495) | (sec) 184–200 (step) 4 |

*) DSC = differential scanning calorimeter

EXAMPLES 2–4

Following the procedure of Example 1, the following components are homogenised, degassed, and cured to mouldings for 2 hours at 100° C. and for 16 hours at 140° C. The properties of the mouldings are indicated in the following table.

|  |  | Ex. 2 | Ex. 3 | Ex. 4 |
|---|---|---|---|---|
| Components | | | | |
| diglycidyl ether of hydrogenated bisphenol A (epoxy value 4.51 equivalents/kg) | | | | 90 g |
| diglycidyl ether of hydrogenated bisphenol F (epoxy value 4.54 equivalents/kg) | | 80 g | 80 g | |
| 2,2,4,4-tetraglycidyloxymethylcyclohexanol (epoxy value 7.45 equivalents/kg) | | 20 g | | |
| 3,4-epoxycyclohexylmethyl-3',4'-epoxycyclo-hexanecarboxylate (according to Example 1) | | | 20 g | |
| bis[(3,4-epoxycyclohexyl)methyl]adipate (epoxy value 4.84 equivalents/kg) | | | | 10 g |
| hexahydrophthalic anhydride | | 79 g | 78 g | 63 g |
| benzyldimethylamine | | 0.3 g | 0.5 g | 0.5 g |
| silanated quartz powder (W 12 EST) | | 269 g | 269 g | 245 g |
| Properties | | | | |
| absorption of boiling water after 100 h (%) | | 0.9 | 0.7 | 0.7 |
| 1% absorption of boiling water after (DIN 53495) | (h) | 130 | 200 | 300 |
| diffusion dielectric strength (VDE 0441) | (step) | HD 2 | HD 2 | |
| Tg (DSC) | (°C.) | 83 | 93 | 89 |
| flexural strength (ISO 178) | (N/mm²) | 143 | 139 | 132 |
| impact strength (ISO 179) | (kJ/m²) | 12.4 | 11.4 | 9.2 |
| deflection temperature under load (ISO 75) | (°C.) | 89 | 91 | 89 |
| creep resistance (IEC 112/VDE 0303) | (CIT) | | >600–0.0 | |
| arc resistance (ASTM 495) | (sec.) (step) | 188–195 4 | 186–193 4 | — |
| weathering test in a Weather-o-Meter (Type Atlas 600 WRC) according to DIN 53 387 (observation of the surface of the moulding after a) 1000 and after b) 2000 hours weathering test (REM*)) | a) b) | no erosion | a) no erosion | a) no erosion |
| reactivity of the casting resin composition: | | | | |
| gelation time at 100° C. (standard gelling machine) | (min.) | 83 | 92 | 88 |
| exothermic reaction (DSC**) | (J/g) | 71 | 71 | 84 |

*REM = raster electron microscope
**DSC = differential scanning calorimeter

What is claimed is:
1. A curable composition comprising
  (a) 90 to 50% by weight of a diglycidyl ether of hydrogenated bisphenol A, a diglycidyl ether of hydrogenated bisphenol F, or a mixture thereof
  (b) 50 to 10% by weight of a cycloaliphatic epoxy resin consisting of formula I, II, III

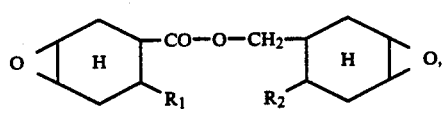
(I)

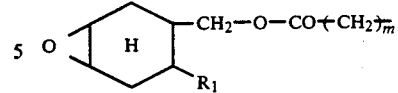
(II)

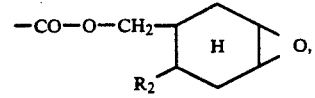

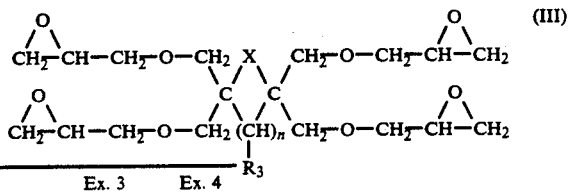
(III)

or a mixture thereof, wherein $R_1$ and $R_2$ are each independently of the other a hydrogen atom or methyl, m is an integer from 2 to 6, X is a group

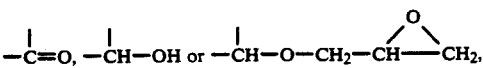

$R_3$ is hydrogen or methyl and n is an integer from 2 to 4, which radical $R_3$ may have different meanings within the molecule and said mixture of components (a) and (b) being 100 % by weight, (c) a cycloaliphatic polycarboxylic anhydride as hardener, and, as additional optional component, (d) a curing catalyst.

2. A composition according to claim 1, wherein component (a) is a diglycidyl ether of hydrogenated bisphenol A or a diglycidyl ether of hydrogenated bisphenol F.

3. A composition according to claim 1, wherein component (b) is a cycloaliphatic epoxy resin of formula I, II or III.

4. A composition according to claim 1, wherein component (b) is a cycloaliphatic epoxy resin of formula I or III.

5. A composition according to claim 1, which contains 85 to 60% by weight of component (a) and 40 to 15% by weight of component (b).

6. A composition according to claim 1, which contains 80 to 70% by weight of component (a) and 30 to 25% by weight of component (b).

7. A composition according to claim 1, wherein component (c) is a cycloaliphatic dicarboxylic anhydride.

8. A composition according to claim 7, wherein the cycloaliphatic dicarboxylic anhydride is hexahydrophthalic anhydride or methylhexahydrophthalic anhydride.

9. A composition according to claim 1, which contains a curing accelerator (d).

10. A moulding or coating obtained from a curable composition as claimed in claim 1 by curing.

* * * * *